United States Patent [19]
Maclean et al.

[11] 4,383,665
[45] May 17, 1983

[54] WIND-DRIVEN ROTATING AIRCRAFT LANDING WHEELS

[76] Inventors: Ewen M. Maclean, c/o George Spector, 3615 Woolworth Bldg., 233 Broadway; George Spector, 3615 Woolworth Bldg., 233 Broadway, both of New York, N.Y. 10007

[21] Appl. No.: 157,671

[22] Filed: Jun. 9, 1980

Related U.S. Application Data

[63] Continuation-in-part of Ser. No. 674,114, Apr. 6, 1976, abandoned.

[51] Int. Cl.³ .............................................. B64C 25/40
[52] U.S. Cl. ................................. 244/103 S; 416/119; 440/97
[58] Field of Search ................. 244/103 S; 440/93, 97; 416/119

[56] References Cited

U.S. PATENT DOCUMENTS 3,529,792  5/1968  MacMahon .................... 244/103 S
3,912,937  10/1975  Lesser ............................... 416/119

FOREIGN PATENT DOCUMENTS 1808199  5/1970  Fed. Rep. of Germany ... 244/103 S
2008755  11/1971  Fed. Rep. of Germany ... 244/103 S
502616  5/1920  France .............................. 416/119
524183  8/1921  France .............................. 416/119

Primary Examiner—Charles E. Frankfort

[57] ABSTRACT

An improved landing wheel for an airplane, which includes a plurality of freely pivoted fins from eccentrically located pivot pins around one side of the wheel, the fins being straight but flexible, so that in one position relative to the wind from a forwardly direction, the fins get caught against the wheel rim and are flexed into a cupped shape for causing the wheel to rotate prior to a landing.

2 Claims, 5 Drawing Figures

WIND-DRIVEN ROTATING AIRCRAFT LANDING WHEELS

This application is a continuation-in-part of Ser. No. 674,114, filed Apr. 6, 1976, now abandoned.

This invention relates generally to airplane landing wheels.

It is well known that airplane wheels are necessitated to start rotating prior to landing of the craft, so as to prevent a blow out of the tire caused by the sudden contact against the stationary ground. Accordingly, numerous devices have been developed in the past for starting such wheel rotation, however, until now such designs are all subject to being improved in order to the more eddicient.

Therefore it is a principal object of the present invention to provide an improved, wind-driven, rotating aircraft landing wheel wherein fins used for catching the wind so as to rotate the wheel, are made flexible in order to change their shapes between the time when they are moved against the wind to an operating position and when they catch the wind.

Another object is to provide an improved, wind-driven, rotating aircraft landing wheel which accordingly is more efficient than one wherein the fins are fixed in shape.

Figure 1:
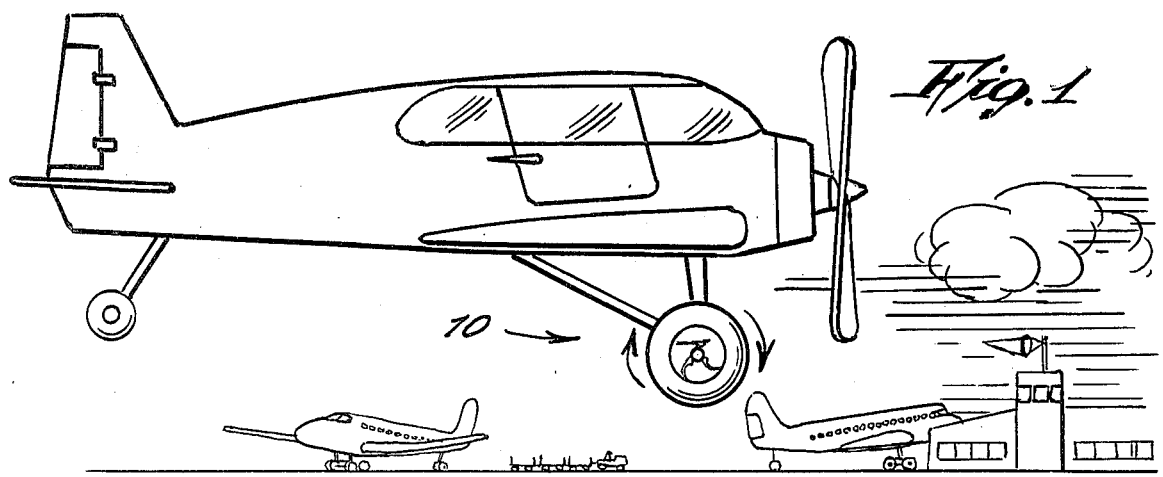
FIG. 1 is a side view of an airplane coming in for a landing and the landing wheels, incorporating the present invention, shown already rotating.
Figures 2, 3:
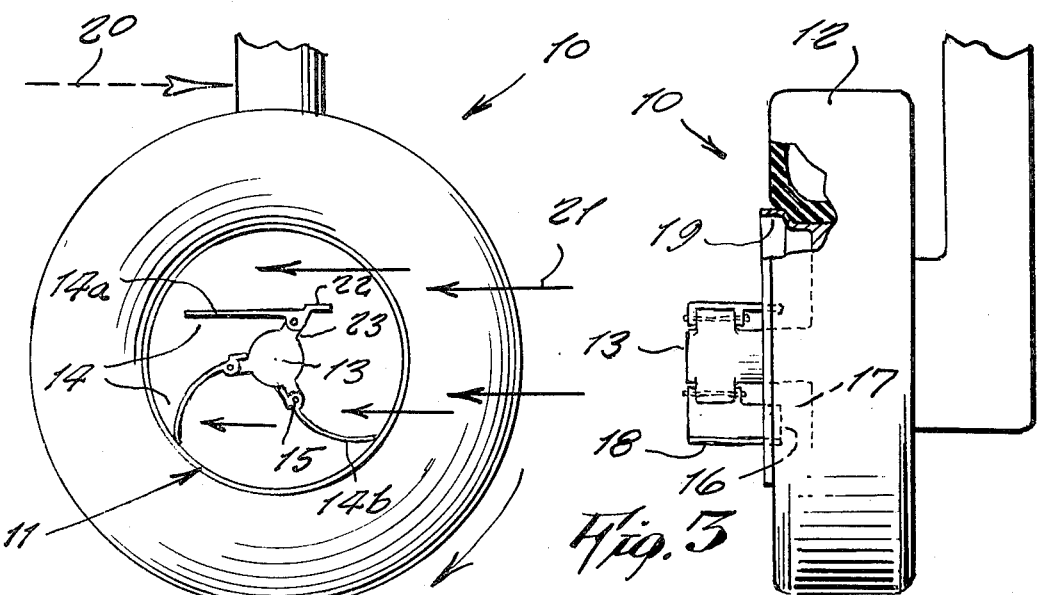
FIG. 2 is an enlarged side view of the wheel invention.
FIG. 3 is a front end view thereof.

Referring now to the drawing in greater detail, and more particularly to FIGS. 1 to 3 thereof at this time, the reference numeral 10 represents an improved, wind-driven, rotating aircraft landing wheel, according to the present invention, wherein there is a wheel member 11 fitted with pneumatic rubber tire 12, and the wheel being integral with a sideward hub 13 from which three fins 14 are each freely pivoted on an eccentrically located pin 15. Each fin is made of a flexible sheet metal, the fin being made to be normally flat. One side end 16 of each fin extends into a well 17 formed on a side of the wheel so that an outer edge 18 of the fin can abutt inside a wheel rim 19 of the wheel during operating use.

In operation, as the wheel is carried forwardly into the wind, as indicated by arrow 20, the fin 14a above the hub is flat and trails rearwardly in a horizontal position, so that it does not catch any of the air or wind 21 moving rearward past the wheel. This is due to the fin side end 16 extending into the well 17 not abutting any of the wheel rim 19. However, the fin 14B located lower than the hub cannot trail freely rearwardly because the edge 18 of the wheel abuts the wheel rim 19 in this position, and the fin is thus forced by the air 21 into the cupped or curved shape as shown, and in which position it thus has a greater efficiency in resistance against the air so as to cause the wheel to rotate. As the wheel turns, the fin is carried around the forward side of the hub so that the fin swings forwardly therearound, thus being changed from a flat shape as shown at 14a to the curved fin shown at 14b. After the fin is carried around the rear of the hub, it is freed from the wheel rim and the end 16 thereof free in the space of well 17 allows the fin to flatten out so as to not resist against the air 21.

Each fin may be made also with a stop 22 projecting from an end thereof for abutting against a shoulder 23 of the hub, so that the portion of the fin extending outwardly of the well is more strongly supported when the fin is in curved shape.

Figure 4:
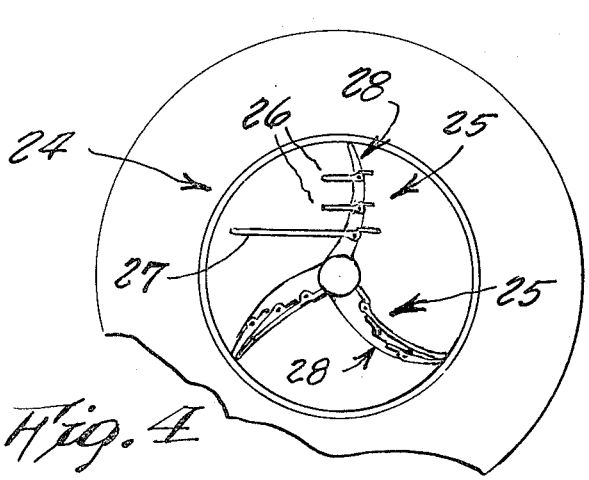
FIG. 4 is a view similar to FIG. 2, and showing a modified design of the invention.
Figure 5:
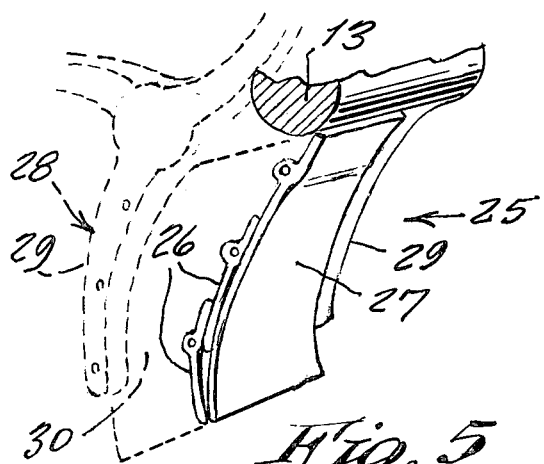
FIG. 5 is an enlarged, perspective, cross sectional detail view of one of the fin units of FIG. 4.

In the design 24, shown in FIGS. 4 and 5, the same operating principals described above as used, however, each fin 14 is substituted by a fin unit 25 wherein two short fins 26 and one long fin 27 are each pivotally carried on a curve-shaped arm 28 projecting from the wheel hub 13 on which it is formed integrally. The arm replaces the above-described well 17, and includes two projections 29 with a wide space 30 therebetween which is selectively closed or left opened by the fins as the wheel turns. Both side ends 16 of the fins 26 and 27 rest against the projections 29 so as to chante to a curve-shape in operative use. It is to be noted that the longer fin 27, located closest the hub, covers the other fins 26 when in operative use, as shown in FIG. 5, so to give greater strength while allowing use of thinner fin material for a greater flexibility thereof.

What is claimed as new, is:

1. An improved, wind-driven, rotating aircraft landing wheel comprising in combination, a wheel member having a rim with a tire and a hub projecting from one side of said wheel member in combination with spaced curved arms extending radially from said hub and a plurality of flexible fins each being supported pivotally free on pivot pins eccentrically mounted on each of said arms, each of said flexible fins being normally flat and projecting from said pins, means for bending said flexible fins in curvate locked extended radial positions responsive to wind pressue when said fins are below a horizontal axis of said hub, said flexible fins pivoting on said pins so as to remain flat above the horizontal axis of said hub, and in further combination with shorter auxiliary fins mounted pivotally on said arms at points spaced outwardly from said pins, whereby the first said fins overlap the auxiliary fins when in the locked radially extended position.

2. The combination as set forth in claim 1, wherein said rim surrounds a well and said means for bending said flexible fins comprises the outer edge of said fin being in abutment with the inner edge of said rim within said well, when said fin is responsive to wind pressure in said extended radial position.

* * * * *